Sept. 2, 1924.  
G. W. MILLER  
SAW CLAMP  
Original Filed May 23, 1923  
1,507,501  
2 Sheets-Sheet 1

George W. Miller.  
INVENTOR  
BY Victor J. Evans.  
ATTORNEY

WITNESS:

Sept. 2, 1924.                                           1,507,501
                        G. W. MILLER
                         SAW CLAMP
            Original Filed May 23  1923    2 Sheets-Sheet 2

George W. Miller.
INVENTOR

BY Victor J. Evans.
ATTORNEY

WITNESS:

Patented Sept. 2, 1924.

1,507,501

UNITED STATES PATENT OFFICE.

GEORGE W. MILLER, OF WAYNESVILLE, NORTH CAROLINA.

SAW CLAMP.

Application filed May 23, 1923, Serial No. 640,934. Renewed July 26, 1924.

*To all whom it may concern:*

Be it known that I, GEORGE W. MILLER, a citizen of the United States, residing at Waynesville, in the county of Haywood and State of North Carolina, have invented new and useful Improvements in Saw Clamps, of which the following is a specification.

This invention relates to saw clamps and contemplates a novel construction in a device of this kind with which the saw can be conveniently associated and clamped while the teeth are being dressed or filed, the clamp being susceptible of pivotal movement so that the clamp and saw can be arranged at any desired angle.

Another object of the invention resides in the provision of a device of the class in question including a main clamp for holding the saw immovable while being dressed or filed, and a secondary clamp designed to engage the saw to prevent the latter from slipping from the device when the main clamp is released to allow the saw to be adjusted along the clamp to bring other portions of the saw in a position to be worked on.

The nature and advantages of the invention will be better understood when the following detailed description is read in connection with the accompanying drawings, the invention residing in the construction, combination and arrangement of parts as claimed.

In the drawings forming a part of this application, like numerals of reference indicate similar parts in the several views, and wherein.

Figure 1:
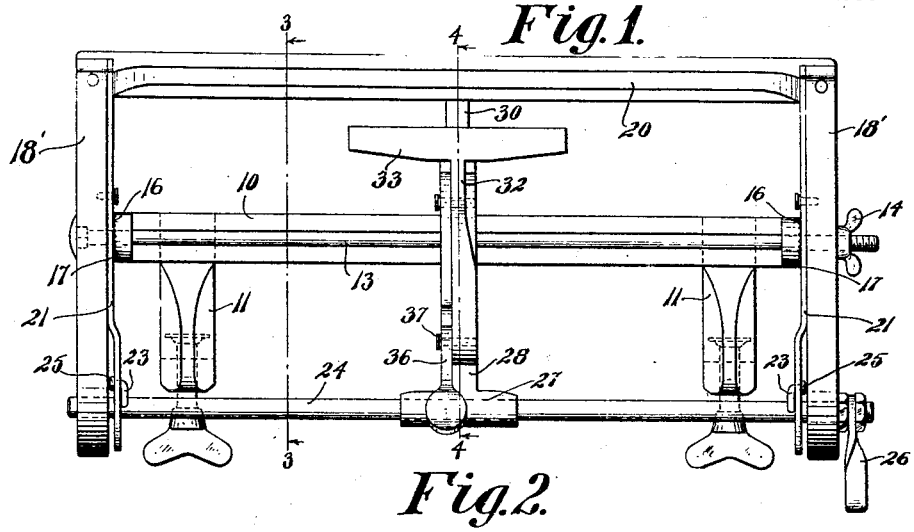
Figure 1 is a side elevation of the device.
Figure 2:
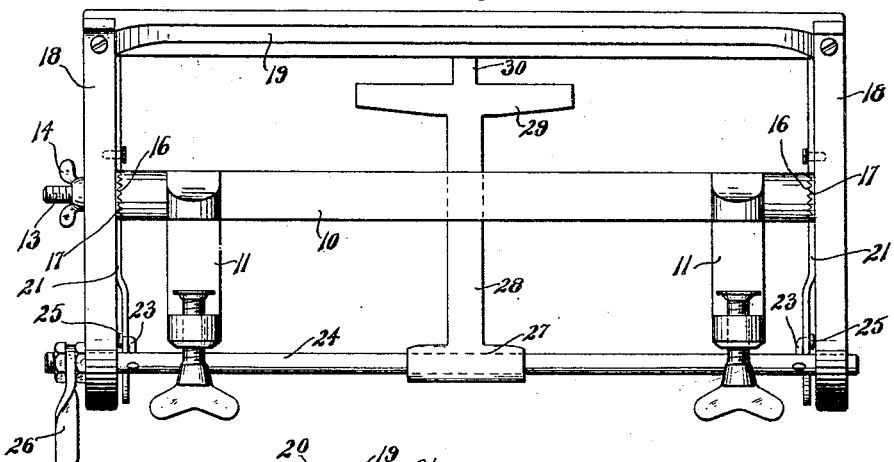
Fig. 2 is a view looking from the opposite side thereof.
Figure 3:
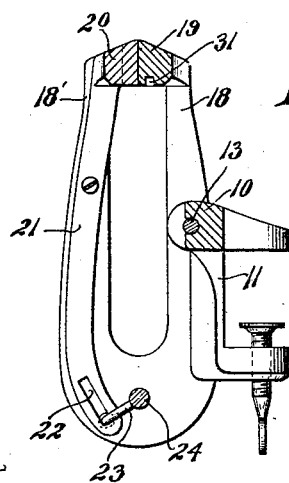
Fig. 3 is a sectional view taken on the line 3—3 of Fig. 1.
Figure 4:
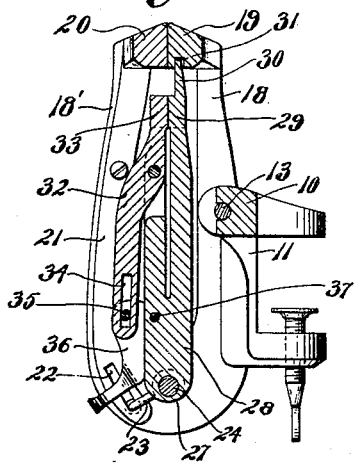
Fig. 4 is a sectional view taken on the line 4—4 of Fig. 1.
Figure 5:
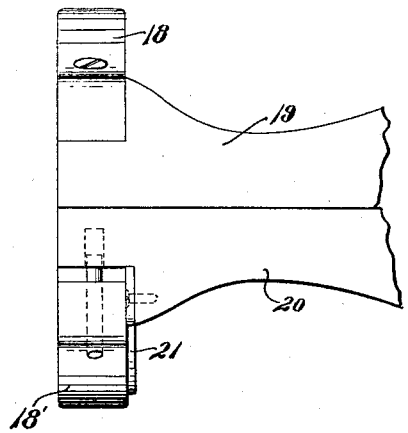
Fig. 5 is an enlarged detail view of the main clamp adjusting device.
Figure 6:
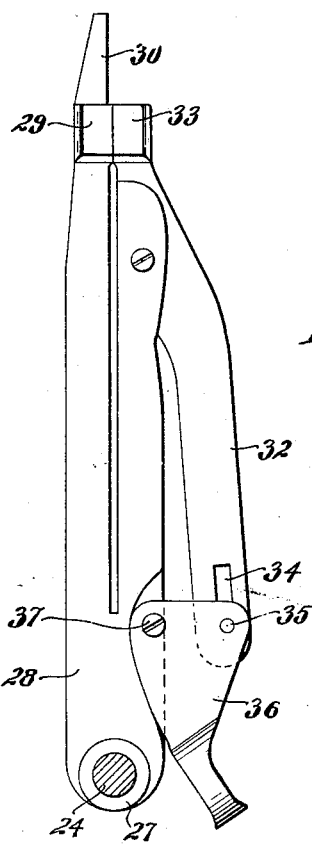
Fig. 6 is a similar view of the means for adjusting the secondary clamp.

Referring to the drawings in detail, 10 indicates a supporting bar on which the clamping device is mounted for pivotal movement, the bar being provided with spaced pairs of parallel lugs 11 with the lowermost lug of each pair equipped with an adjusting screw to permit the bar 10 to be clamped to the edge of the work table or other suitable support. A headed element 13 is passed through the bar 10 and also through the end members of the clamping device, which end members are pivoted upon the element 13 so that the clamping device can be arranged at any desired angle so that light may be thrown upon the work being done or the saw arranged at an angle for the comfort of the operator. A thumb nut 14 is threaded on one end of this element and when tightened holds the clamping device fixed with relation to the bar 10. The opposed ends of the bar are serrated as at 16 and cooperates with the teeth or serrations 17 formed on the end members of the clamp to assist in holding the parts fixed relatively, subsequent to the tightening of the nut 14.

The clamping device essentially embodies a pair of spaced U-shaped end members, and the corresponding limbs 18 of these members are connected by a stationary jaw in the nature of a bar herein indicated at 19. A movable jaw 20 cooperates with the fixed jaw 19, and is of course movable toward and away from the fixed jaw, in a manner to be presently described. The movable jaw is therefore supported on the upper corresponding extremities of arms 21, these arms being pivoted at points in their length to the corresponding limbs 18 of the U-shaped end members. The arms are curved at their lower ends, and the curved portions are provided with slots 22 to receive fingers 23 projecting from a rod 24 which is journalled in the lower portions of the U-shaped end members as shown. These fingers 23 are flanged or headed at their outer ends, the flanges 25 being arranged between the end members of the clamp and the arms pivoted thereon to prevent casual separation of the parts. The rod 24 is provided with a handle or manipulating portion 26 at one end of the clamp so that the rod can be partially rotated in either direction as the occasion requires. Manifestly when this handle is moved downwardly the rod 24 is rotated moving the fingers through the slots of said arms in a direction that imparts pivotal movement to the arms for the purpose of moving the jaw 20 into gripping relation with the jaw 19. Conversely, when the manipulating portion or handle 26 is moved upwardly, the movement of the various parts is reversed, thereby separating the jaws 19 and 21 respectively.

Arranged between the end members of the clamp and beneath the jaws thereof is a secondary clamp for the purpose to be hereinafter described, this clamp including a sleeve like member 27 mounted to slide upon the rod 24. Rising from the sleeve 27 is a standard 28 supporting at its upper end a fixed jaw 29, and rising from this jaw is a lug or extension 30 movable in a longitudinal slot 31 formed on the underside of the fixed jaw 19. This lug or extension 30 assists in guiding the secondary jaw in its movement longitudinally of the rod 24. Pivoted on the standard 28 is the shank 32 of a movable jaw 33, the latter mentioned jaw being mounted to move toward and away from the fixed jaw 29. The shank 32 is slotted as at 34 and receives a pin 35 eccentrically mounted upon the cam shaped lever 36 pivoted as at 37. Obviously, when the lever 35 is moved downwardly, the movable jaw 29 is moved into clamping relation with the fixed jaw, and when the lever is lifted, these jaws are separated.

In practice, the saw to be dressed or otherwise dealt with is arranged between the jaws 19 and 20 of the main clamp and also between the jaws of the secondary clamp just described. Prior to clamping the jaws of the secondary clamp the latter is moved along the rod 24 to occupy the position adjacent one end of the device. With the saw clamped between the jaws of the respective clamps, it is held rigid while the saw is being dressed or the like, it being understood that the entire clamping structure can be swung upon its pivotal connection with the supporting bar 10 to arrange the saw in any desired position or degree of inclination. After that portion of the saw arranged between the main clamps has been properly dealt with, it is necessary to move the saw longitudinally through the clamp to arrange another portion of the saw in a position whereby it can be dressed. When the jaws 19 and 20 of the main clamp have been released, the secondary clamp still engages the saw and prevents it from falling out of the device and at the same time provides an adjustable support for the saw where it can be moved between and longitudinally of the jaws of the main clamp.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A saw clamping device comprising a main clamp having a fixed jaw and a movable jaw, the fixed jaw being provided with a longitudinal groove, a rod supported by the clamp, a secondary clamp slidably mounted on said rod and including a fixed jaw and a movable jaw arranged directly beneath the jaws of the first-mentioned clamp, and an extension projecting from the fixed jaw of the secondary clamp and movable in said longitudinal groove for the purpose specified.

2. A saw clamping device comprising a supporting structure, a clamp mounted on said structure and including U-shaped end portions, a fixed jaw connected with said end portions, arms pivoted on said end portions, a movable jaw supported by said arms for movement toward and away from the fixed jaw, said arms having slots, a rod journalled on the end portions, means for partially rotating said rod, and fingers projecting from said rod and having offset terminals received by the slots of said arms, whereby said movable jaw is controlled by the rotation of said rod.

In testimony whereof I affix my signature.

GEORGE W. MILLER.